(12) United States Patent
Spartano et al.

(10) Patent No.: US 7,952,321 B2
(45) Date of Patent: *May 31, 2011

(54) DEVICE HAVING AN ENERGY CONVERTER AND AN ENERGY LIMITER TO LIMIT SUPPLIED ELECTRICAL ENERGY

(75) Inventors: David Spartano, Brunswick, OH (US); Peter F. Hoffman, Avon, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/769,322

(22) Filed: Apr. 28, 2010

(65) Prior Publication Data

US 2010/0207584 A1    Aug. 19, 2010

Related U.S. Application Data

(63) Continuation of application No. 12/429,435, filed on Apr. 24, 2009, now Pat. No. 7,723,950, which is a continuation of application No. 11/523,157, filed on Sep. 19, 2006, now Pat. No. 7,550,943.

(51) Int. Cl.
*H01M 10/46* (2006.01)
(52) U.S. Cl. ........................................................ 320/107
(58) Field of Classification Search .................. 320/107, 320/112, 114
See application file for complete search history.

(56) References Cited

U.S. PATENT DOCUMENTS

| | | | |
|---|---|---|---|
| 3,711,768 A | 1/1973 | Frazin | |
| 3,973,139 A | 8/1976 | Dingwall | |
| 4,164,145 A * | 8/1979 | Aron | 73/293 |
| 4,346,329 A | 8/1982 | Schmidt | |
| 5,149,190 A | 9/1992 | MacKenzie | |
| 5,386,592 A | 2/1995 | Checkoroski | |
| 5,406,207 A | 4/1995 | Shershen | |
| 5,438,225 A | 8/1995 | Berger | |
| 5,563,456 A | 10/1996 | Berger | |
| 5,685,632 A | 11/1997 | Schaller et al. | |
| 6,556,067 B2 | 4/2003 | Henry | |
| 6,727,805 B2 * | 4/2004 | Hollister et al. | 340/326 |
| 6,798,348 B1 | 9/2004 | Wilker et al. | |
| 6,857,756 B2 | 2/2005 | Reiff et al. | |
| 6,857,758 B1 | 2/2005 | Sharrah et al. | |

(Continued)

FOREIGN PATENT DOCUMENTS

CN    2515509 Y    10/2002

(Continued)

OTHER PUBLICATIONS

Communication pursuant to Article 94(3) EPC, European Patent Office, 80298 Munich, Germany, Application No. 07838385.8-2423, mailed Oct. 8, 2009.

(Continued)

*Primary Examiner* — Edward Tso
(74) *Attorney, Agent, or Firm* — Michael C. Pophal

(57) ABSTRACT

An electrical device (100) includes a housing (102), a battery receiving region (104), device electrical circuitry (112), an energy converter (110), and an energy limiter (108). The battery receiving region (104), the circuitry (112), the energy converter (110) and the energy limiter (108) are located within the housing (102). The energy converter (110) has an input dynamic range for supplied electrical energy and converts the energy to a level suitable for powering the device circuitry (112). The energy limiter (108) limits the supplied electrical energy.

20 Claims, 4 Drawing Sheets

U.S. PATENT DOCUMENTS

| | | | |
|---|---|---|---|
| 6,859,145 | B2 | 2/2005 | Wilker et al. |
| 6,979,100 | B2 | 12/2005 | Reiff et al. |
| 6,987,366 | B2 | 1/2006 | Yu |
| 7,186,000 | B2 | 3/2007 | Lebens et al. |
| 7,241,025 | B2 | 7/2007 | Kim |
| 7,550,943 | B2 * | 6/2009 | Spartano et al. ............. 320/107 |
| 7,705,542 | B2 | 4/2010 | Hilt et al. |
| 7,723,950 | B2 * | 5/2010 | Spartano et al. ............. 320/107 |
| 2004/0124782 | A1 | 7/2004 | Yu |
| 2005/0040773 | A1 | 2/2005 | Lebens et al. |
| 2005/0047181 | A1 | 3/2005 | Yamamoto et al. |
| 2006/0109662 | A1 | 5/2006 | Reiff et al. |
| 2006/0164828 | A1 | 7/2006 | Kim |
| 2007/0159816 | A1 | 7/2007 | Bayat et al. |
| 2008/0068832 | A1 | 3/2008 | Spartano et al. |

FOREIGN PATENT DOCUMENTS

| | | |
|---|---|---|
| CN | 2723811 Y | 9/2005 |
| EP | 0385417 A | 3/1990 |
| SU | 1154461 A1 | 5/1985 |
| WO | 9324789 A | 12/1993 |
| WO | 2004025168 A | 3/2004 |
| WO | 2004025168 A1 | 3/2004 |

OTHER PUBLICATIONS

Analog Devices, Leading Semiconductors for Wireless Handsets, data sheet, 1995-2006, 12 pages.
Dallas Semiconductors, MAXIM Application note 725 DC/DC Conversion without Inductors, Dec. 29, 2000, 8 pages, http://www.maxim-ic.com/legal.
Batteries in a Portable World, Protection Circuits, 2001, 4 pages.
ECOM Instruments, Intrinsically-Safe Handlamp H-4 DC A, data sheet and instruction manual, Nov. 2001, 12 pages, www.ecom-ex.com.
ECOM Instruments, Lite-Ex HD 10, Instruction Manual, Feb. 2001, 7 pages, www.ecom-ex.com.
Communications-Applied Technology, AMCVIS—Advanced Multi-Channel Vehicle Intercom System Field Commentary, 2001-2003, 1 page.
Communications-Applied Technology, AMCVIS—Advanced Multi-Channel Vehicle Intercom System Frequently Asked Questions, 2001-2003, 1 page, Reston, Virginia.
Communications-Applied Technology, AMCVIS—Advanced Multi-Channel Vehicle Intercom System Price List, 2001-2003, 5 pages, Reston, Virginia.
Communications-Applied Technology, AMCVIS—Advanced Multi-Channel Vehicle Intercom System Documentation, 2001-2003, 1 page, Reston, Virginia.
Communications-Applied Technology, Headsets for Intrinsically Safe Wireless Intercom System product sheet, 2001-2003, 2 pages, Reston, Virginia.
Communications-Applied Technology, Headsets for Intrinsically Safe Wireless Intercom System Description and Features, 2001-2003, 4 pages, Reston, Virginia.
Communications-Applied Technology Products from Communication-Applied Technology Product Links and Presentations sheet, 2001-2003, 2 pages, Reston, Virginia.
ECOM Instruments, Intrinsically-Safe Laserpointer Ex Point 01 Data Sheet, 2001-2004, 1 page, http://www.ecomus-ex.com/us/products/flashlights/laserpointer01/detai....
Dallas Semiconductor, MAXIM Application Note 1021 Buck/Boost Charge-Pump Regulator Powers White LEDs from a Wide 1.6V to 5.5V Input, Mar. 27, 2003, 2 pages, http://www.maxim-ic.com/an1021.
Dallas Semiconductors, MAXIM Application Note 1037 Charge-Pump Step-Up DC-DC Converter Solutions for Powering White LEDs in Series or Parallel Connections, Apr. 23, 2002, pp. 1-12.
AEMC Instruments, Digital Ground Resistance Tester Models 4620 & 4630 data sheet, Aug. 2002, pp. 1-6. www.aemc.com.
Underwriters Laboratories, Inc. (UL), UL 913 Intrinsically safe Apparatus and Associated Apparatus for Use in Class I, II, and III, Division 1, Hazardous (Classified) Location, Aug. 8, 2002, pages title p. B2, sixth edition.
ECOM Instruments, Intrinsically Safe LED Pocket flashlight Lite-Ex LED 30 data sheet, downloaded Feb. 2002, 1 page.
Ken Wasko, The Inside on Intrinsically Safe Radios, Private Wireless, Mar. 2003, pp. 14-16.
Cree Lighting, Cree XLamp 7090 Packaged LEDs data sheet, 2004, pp. 1-19, www.cree.com/xlamp.
3D Instruments, LLC, DPG-6600 Battery Powered Digital Gauge data sheet, 2004, 4 pages, Anaheim CA.
Hazardous Area Direct, i.roc 627 FM Class 1 Div. 1/ATEX Zone 1 PDA + 1 GB data sheet, 2004 6 pages.
Linear Technology, LTC3204-3.3/LTC3204-5/LTC3204B-3.3/LTC3204B-5 Low Noise Redulated Charge Pump in 2x2 DFN data sheet, 2004, pp. 1-12, Milpitas, CA, www.linear.com.
Hazardous Area Direct, TMRT 1Ex Intrinsically Safe Laser Tachometer data sheet, 2004, 2 pages.
Beka Associates, LTD., Instruction sheet for BA369 Intrinsically Safe battery powered clock, Dec. 2004, pp. 1-4, www.beka.co.uk.
Linear Technology, LTC3215 700mA Low Noise High Current LED Charge Pump data sheet, 2005, pp. 1-12, Milpitas, CA, www.linear.com.
Bluechips Technology, BCT3511S DC/DC Converter for 1 Watt White LED data sheet, 2005, pp. 1-9, www.bluechipstech.com.
Underwriters Laboratories, Inc., Definitions of Commonly Used hazardous locations for terminology, Hazardous Locations, 2005, 6 pages.
Energizer, 459 Industrial Flashlight Engineering Datasheet, May 2005, 1 page, www.energizer.com.
Energizer, 1259 Industrial Safety Flashlight Engineering Datasheet, May 2005, 1 page, www.energizer.com.
Energizer, 1359 Industrial Flashlight Engineering Datasheet, May 2005, 1 page, www.energizer.com.
SA EX Instruments, The Lite-EX 15, 20, 23, 25 series of Explosion proof flashlights product sheet, 2006, 2 pages.
SA EX Instruments, The L2000 Explosion Proof Rechargeable Flashlight Product Sheet, 2006, 2 pages.
Hazardous Area Direct, Definitions of Classes and Zones, downloaded Jul. 26, 2006, 8 pages, http://www.hazardousareadirect.com/Classificationinfo/Definitions.htm.
Author Unknown, Hazardous (Classified) Locations, downloaded Aug. 15, 2006, pp. 10,13,15-16,18,25, http://www.labtrain.noaa.gov/osha600/mod07/0713--.htm.
Author Unknown, Intrinsic Safety Basic Principles, Technology for Safety, downloaded Aug. 17, 2006, pp. 159-172.
OMEGA, OM-CP-RHTEMP1000IS Intrinsically Safe Humidity and Temperature Datalogger data sheet, downloaded Aug. 17, 2006, 2 pages, www.omega.com.
GM International Technology for Safety, Understanding Hazardous Location datasheet, downloaded Aug. 17, 2006, 1 page, www.gmisafety.com.
ECOM Instruments, Intrinsically Safe Ultrasonic Wall Thickness Gauge 1071-Ex data sheet, downloaded Sep. 11, 2006, 1 page, www.ecom-ex.com.
METRIX, MX 57Ex, 50,000-count TRMS Digital Multimeter data sheet, 2 pages, downloaded Sep. 12, 2006, www.chauvin-arnoux.co.uk.
ECOM Instruments, Ex-Penlight data sheet and operating instructions, downloaded Sep. 12, 2006, 9 pages, www.ecom-ex.com.
ECOM Instruments, Lite-Ex LED 30 operating instructions, downloaded Sep. 12, 2006, 9 pages, www.ecom-ex.com.
Patent Cooperation Treaty (PCT), International Search Report and Written Opinion for Application No. PCT/US2007/020168, filed Sep. 18, 2007, mailed Jan. 23, 2008, European Patent Office, Netherlands.
Patent Cooperation Treaty (PCT), International Search Report and Written Opinion for Application No. PCT/US2007/020171, filed Sep. 18, 2007, mailed Apr. 22, 2008, European Patent Office, Netherlands.
US Patent and Trademark Office, Office Communication for U.S. Appl. No. 11/523,149, filed Sep. 19, 2006, mailed Apr. 15, 2009, US Patent and Trademark Office, Alexandria, VA.

* cited by examiner

DEVICE HAVING AN ENERGY CONVERTER AND AN ENERGY LIMITER TO LIMIT SUPPLIED ELECTRICAL ENERGY

RELATED APPLICATIONS

This application is a continuation of U.S. application Ser. No. 12/429,435, filed Apr. 24, 2009, which is a continuation of U.S. application Ser. No. 11/523,157, filed Sep. 19, 2006, now U.S. Pat. No. 7,550,943.

BACKGROUND

The present application relates to battery powered electrical devices for use in hazardous locations. While it finds particular application to hand-held and other readily transportable devices, the application also relates to stationary, battery-backed, and other battery powered electrical devices suitable for use in environments which present a risk of fire or explosion.

Battery powered electrical devices are ubiquitous. Indeed, such devices are widely used in home, commercial, industrial, and other environments to perform a wide variety of functions. Unless specifically designed, however, such devices are not typically suited for use in hazardous locations.

Hazardous (classified) locations include those locations in which ignitable concentrations of flammable or combustible materials are or may reasonably be expected to be present in the atmosphere. Such locations can be encountered, for example, in petrochemical, mining, agricultural, and industrial facilities. Depending on the classification scheme, hazardous locations may be classified in various ways. In North America, for example, a Class I, Division 1 hazardous location is a location where ignitable concentrations of flammable gases, vapors or liquids can exist under normal operating conditions, may frequently exist because of repair or maintenance operations or because of leakage, or may exist because of an equipment breakdown that simultaneously causes the equipment to become a source of ignition. Under a classification scheme which is used outside of North America, a Zone 0 hazardous location is a location where an explosive gas-air mixture is continuously present or present for long periods.

Various techniques have been used to render electrical equipment suitable for use in hazardous locations. One technique involves the use of explosion-proof housings. An explosion proof housing is designed to withstand an explosion occurring within it and to prevent the ignition of combustible materials surrounding the housing. Explosion-proof housings also operate at an external temperature below that which is sufficient to ignite surrounding materials. While explosion-proof housings can be quite effective, they tend to be both expensive and physically large, rendering them relatively unattractive for use in applications in which cost or physical size is a factor.

Another technique involves the use of purging, in which an enclosure is supplied with a protective gas at a sufficient flow and positive pressure to reduce the concentration of a flammable material to an acceptable level. However, purging systems can be relatively complex, and a source of purge gas may not readily available.

Another technique involves the use of intrinsically safe electrical circuits. Intrinsically safe circuits are typically energy limited so that the circuit cannot provide sufficient energy to trigger a fire or explosion under normal operating or fault conditions. One definition of an intrinsically safe circuit which is sometimes used in connection with the certification of intrinsically safe equipment is contained in Underwriters Laboratory (UL) Standard 913, entitled *Intrinsically Safe Apparatus and Associated Apparatus for Use in Class I, II, and III, Division 1, Hazardous (Classified) Locations*. According to this definition, an intrinsically safe circuit is one in which any spark or thermal effect, produced normally or in specified fault conditions, is incapable, under the test conditions proscribed in [the UL 913] standard, of causing ignition of a mixture of a flammable or combustible material in air in the mixture's most easily ignitable concentration.

Various intrinsically safe battery powered electrical devices have been produced. Examples include flashlights, laser pointers, scales, digital voltmeters (DVMs), radios, clocks, and wall thickness monitors. One flashlight has included three (3) light emitting diodes (LEDs) each having a nominal forward voltage of about 3.6 volts direct current (VDC). The flashlight has been powered by three (3) 1.5 VDC Type N batteries, with an energy limiting resistor disposed electrically in series between the batteries and the LEDs. A particular disadvantage of such a configuration, however, is that three (3) batteries are required to supply the nominal 3.6 VDC forward voltage of the LEDs. A still further disadvantage is that the current supplied to the LEDs is a function of the battery voltage, the LED forward voltage, and the series resistance. As a result, the intensity of the light produced by the flashlight can vary significantly as the batteries discharge. Moreover, such a configuration utilizes the energy from the batteries relatively inefficiently, so that the flashlight is relatively bulky for a given light output and operating time.

Other intrinsically safe flashlights have included an incandescent or halogen bulb powered by two (2) AAA batteries, again connected electrically in series through a current limiting resistor. This configuration again suffers from variations in light intensity and a relatively inefficient utilization of the available battery energy. While the bulbs can be operated on the voltage supplied by only two batteries, devices containing such bulbs cannot readily be certified for use in Class I, Division I locations, thereby limiting their utility.

Still other devices have been powered by intrinsically safe lithium ion (Li Ion) batteries having a nominal voltage of about 3.6 VDC. While the relatively higher output voltage of these batteries provides additional application flexibility, they tend to be less widely available than other battery types.

Moreover, some devices require multiple voltage and/or current supplies. While it is possible to provide different batteries for powering different parts of the device or to connect multiple batteries in series to provide different output voltages, it is generally desirable to reduce the number and/or types of batteries required to power a particular device.

SUMMARY

Aspects of the present application address these matters, and others.

According to one aspect, an electrical device includes a housing, a battery receiving region, device electrical circuitry, an energy converter, and an energy limiter. The battery receiving region, the circuitry, the energy converter and the energy limiter are located within the housing. The energy converter has an input dynamic range for supplied electrical energy and converts the energy to a level suitable for powering the device circuitry. The energy limiter limits the supplied electrical energy.

According to another aspect, an intrinsically safe device includes a battery receiving region which accepts at least a first generally cylindrical battery, first device electrical circuitry, and a first boost converter which converts electrical energy from the at least a first battery to a voltage suitable for powering the first device electrical circuitry. The device is intrinsically safe for use in a hazardous location.

According to yet another aspect, an intrinsically safe, battery powered device includes first electrical circuitry which performs a function of the device, a battery receiving region, and an intrinsically safe, active power supply circuit which uses energy from a battery received in the battery receiving region to power the first electrical circuitry.

According to another aspect of the present application, a method of operating an electrical device includes receiving electrical energy from at least a first battery disposed in a battery receiving region of the device, using a first intrinsically safe active power supply circuit to supply electrical energy received from the at least a first battery to first electrical circuitry of the device.

According to another aspect, an intrinsically safe battery powered device includes a battery receiving region adapted to receive at least a first battery, first device electrical circuitry, and a first intrinsically safe charge pump which uses energy from the at least a first battery to power the device electrical circuitry.

According to another aspect, a battery powered, intrinsically safe charge pump power supply which transfers electrical energy from at least a first battery to an electrical load is provided.

Those skilled in the art will recognize still other aspects of the present application upon reading and understanding the attached description.

BRIEF DESCRIPTION OF THE DRAWINGS

The present application is illustrated by way of example and not limitation in the figures of the accompanying drawings, in which like references indicate similar elements and in which.

DETAILED DESCRIPTION

Figure 1:
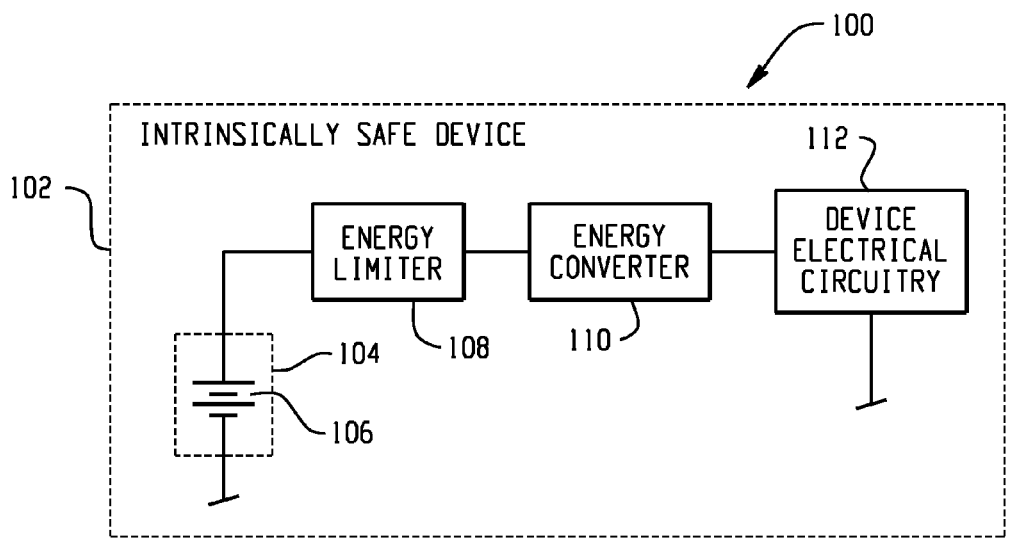
FIG. 1 depicts an intrinsically safe, battery powered device.

With reference to FIG. 1, an intrinsically safe battery powered electrical device 100 includes a housing 102 which carries a battery receiving region 104 for receiving one or more batteries 106, an energy limiter 108, an energy converter 110, and device electrical circuitry 112 which performs a function of the device. The configuration of the housing 102 and characteristics of the electrical circuitry 112 are a function of the nature and function of the device 100.

The number and type of batteries 106 required to power the device 100 and hence the configuration of the battery receiving region 104 are likewise a function of the electrical characteristics of the device electrical circuitry 112, the desired operating time and size of the device 100, and similar factors. In one implementation, however, the battery receiving region 104 is configured to accept one (1) or more standard AAA, AA, C, or D-size batteries.

The batteries 106, energy limiter 108, energy converter 110, and device electrical circuitry 112 are configured as an intrinsically safe circuit which is suitable for use in hazardous locations. As the batteries 106 are typically capable of supplying energy sufficient to render the device 100 non-intrinsically safe, the energy limiter 108 limits the available energy so that any spark or thermal effect produced during normal operation of the device 100 or under fault conditions is incapable of causing ignition of a mixture of a flammable or combustible material in air in the mixture's most easily ignitable concentration. The energy limiter 108 should be located as near as practicable to the battery receiving region 104, and the requisite electrical connections should be suitably spaced and insulated so as to prevent or otherwise reduce the likelihood of shorts, opens, or other faults.

Figure 2:
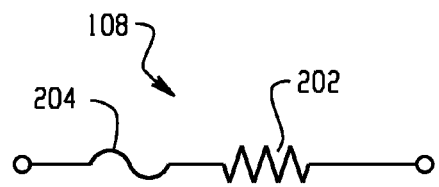
FIG. 2 depicts an energy limiter.

With reference to FIG. 2, the energy limiter 108 includes a series connected resistor 202 and fuse 204. The resistor 202 is selected to limit the instantaneous current available to the energy converter 110 and device electrical circuitry 112 to a level which satisfies the requirements of intrinsic safety. The fuse 204, which is ordinarily implemented as a fast acting, encapsulated fuse, is selected primarily to limit thermal effects in the event of a fault condition. The energy limiter 108 may also be implemented as a fuse protected or resistor protected shunt diode barrier. The latter implementations are particularly attractive where the physical configuration of the battery receiving region 104 or the associated battery contacts is such that relatively higher voltages may be encountered.

The energy converter 110 includes active electrical circuitry such as a direct current to direct current (DC to DC) converter which converts energy from the batteries 106 to a form suitable for powering the device electrical circuitry 112. Where the device 100 is configured to accept both primary (non-rechargeable) and secondary (rechargeable) batteries, or otherwise having different chemistries, the converter 110 advantageously has an input dynamic range which accommodates the voltages produced by the relevant battery types. An alkaline battery, for example has a nominal open circuit voltage of about 1.5 volts direct current (VDC), whereas a nickel metal hydride (NiMH) battery has a nominal open circuit voltage of about 1.2 VDC. In an implementation in which the battery receiving region 104 is configured to receive two (2) batteries connected electrically in series, the nominal open circuit input voltage would thus range between about 2.4 for a device containing two NiMH batteries and 3.0 VDC for a device containing two alkaline batteries. Depending on the requirements of a particular application, it is also desirable that the input dynamic range accommodate decreases in input voltage which occur as the battery(ies) 106 are loaded and/or become discharged.

The energy converter 110 may be configured as a voltage source, a current source, or as having other output characteristics which are suitable for powering the device electrical circuitry 112. Note that the converter 110 need not function as an ideal voltage or current source. Thus, converter 110 is ordinarily designed to have an equivalent series or parallel resistance (as the case may be) which is compatible with the requirements of the device electrical circuitry 112.

Figure 3:
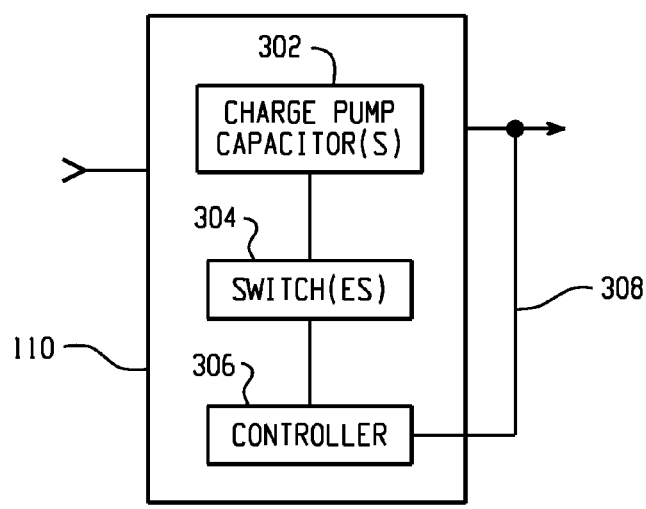
FIG. 3 depicts an energy converter.

In one implementation, and with reference to FIG. 3, the energy converter 110 includes a charge pump which includes one more charge pump capacitors 302, one or more semiconductor or other switches 304, and a controller 308. Where closed loop control of the energy converter 110 output is provided, a feedback signal 308 is provided to the controller 306.

Figure 4A:
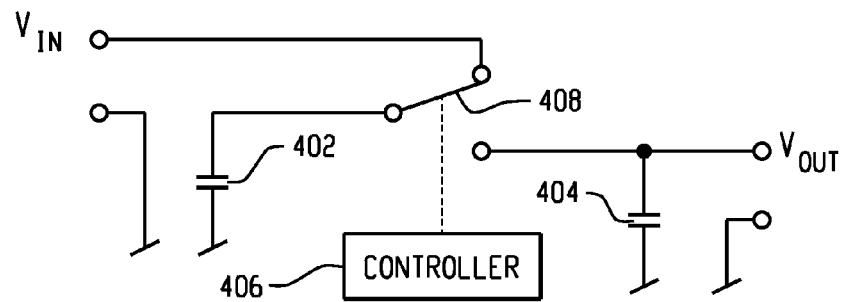
FIGS. 4A, 4B, 4C, 4D, and 4E depict energy converters.

FIG. 4A depicts a charge pump which is particularly well to situations requiring step down voltage conversion. As illustrated, the charge pump includes a charge pump capacitor 402, an output energy storage device such as a capacitor 404, a controller 406, and a semiconductor switch 408. The controller 406 varies the switch 406 between a first state (shown in FIG. 4A) in which the charge pump capacitor 402 receives energy from the batteries 106 and a second state in which energy from the charge pump capacitor 402 is transferred to the output capacitor 404. The controller 406 may also include a control circuit which adjusts the operation of the switch 408 based on a measured value of the output voltage or current. Though illustrated as a single pole double throw (SPDT) switch, the switch 408 may also be implemented using semiconductor or other devices which function as single pole single throw (SPST) switches.

Figure 4B:
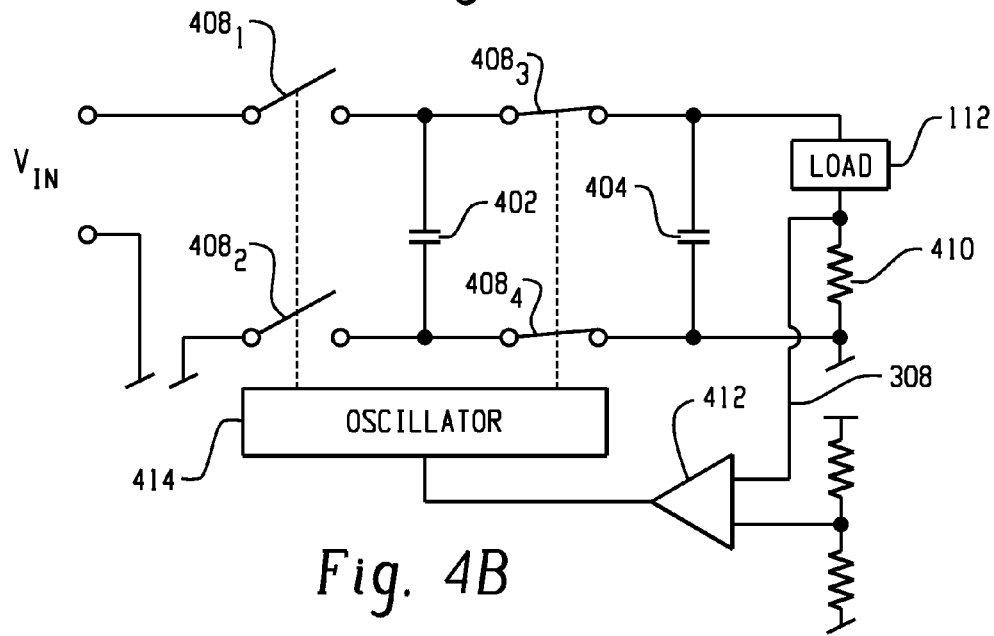

A charge pump which operates as a current source is shown in FIG. 4B. As illustrated, the circuit includes a flying charge pump capacitor 402, an output capacitor 404, and a plurality of switches $408_1$, $408_2$, $408_3$, $408_4$. Energy from the charge pump capacitor 402 is transferred to the device electrical circuitry side when the switches $408_3$, $408_4$ are closed and switches $408_1$, $408_2$, are open (shown in FIG. 4B); the flying capacitor 402 is charged when the switches $408_1$, $408_2$ are closed and the switches $408_3$, $408_4$ are open. A measurement apparatus such as a current sense resistor 410 connected electrically in series with the device electrical circuitry 112 provides a feedback signal indicative of the device electrical circuitry current. The controller 406 includes a control circuit 412 and an oscillator 414 which cooperate to control the operation of the switches 408 to provide the desired current output.

Figure 4C:
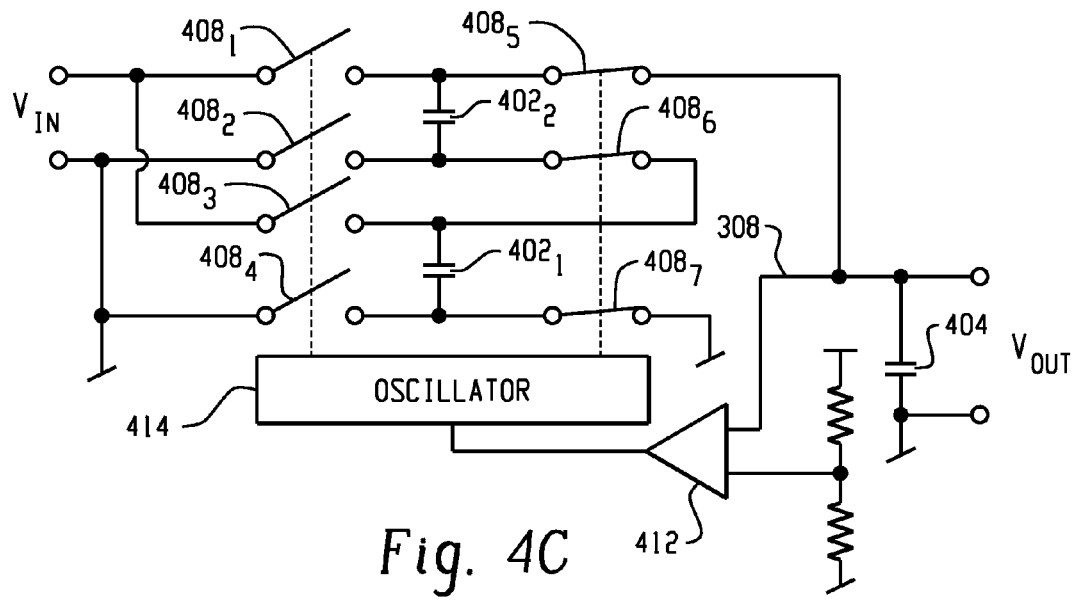

A charge pump which operates as a regulated voltage boost converter is shown in FIG. 4C. As illustrated, the circuit includes first $402_1$ and $402_2$ second flying charge pump capacitors, an output capacitor 404, and a plurality of switches $408_1$, $408_2$, $408_3$, $408_4$, $408_5$, $408_6$, $408_7$ which are configured as a voltage doubler. When connected to the output side (as shown in FIG. 4C), the capacitors 402 are connected electrically in series; when connected to the input side, the capacitors 402 are connected electrically in parallel. Such a configuration provides up to about a two (2) times voltage boost. The controller 406 includes a control circuit 412 and an oscillator 414. As illustrated, the controller 412 receives a feedback signal 308 indicative of the converter 110 output voltage. The control circuit 412 and oscillator 414 cooperate to control the operation of the switches 408 to provide the desired output voltage. Note that a voltage divider may also be implemented by connecting the capacitors in series when connected to the input and in parallel when connected to the output.

Figure 4D:
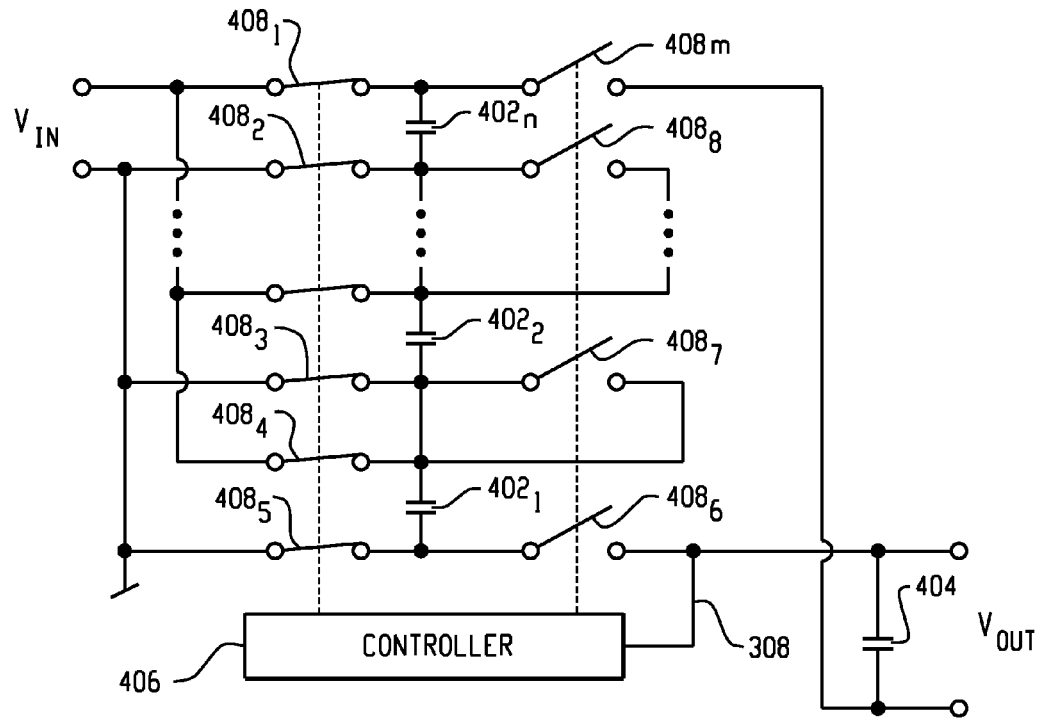

A charge pump which operates as an inverting boost converter is shown in FIG. 4D. As illustrated, the circuit includes a plurality of flying charge pump capacitors $402_n$, an output capacitor 404, a plurality of switches $408_{1-m}$, and a controller 406. As configured, the circuit provides up to approximately a negative n-times voltage boost. The controller 406 provides the desired output regulation, if any.

Figure 4E:
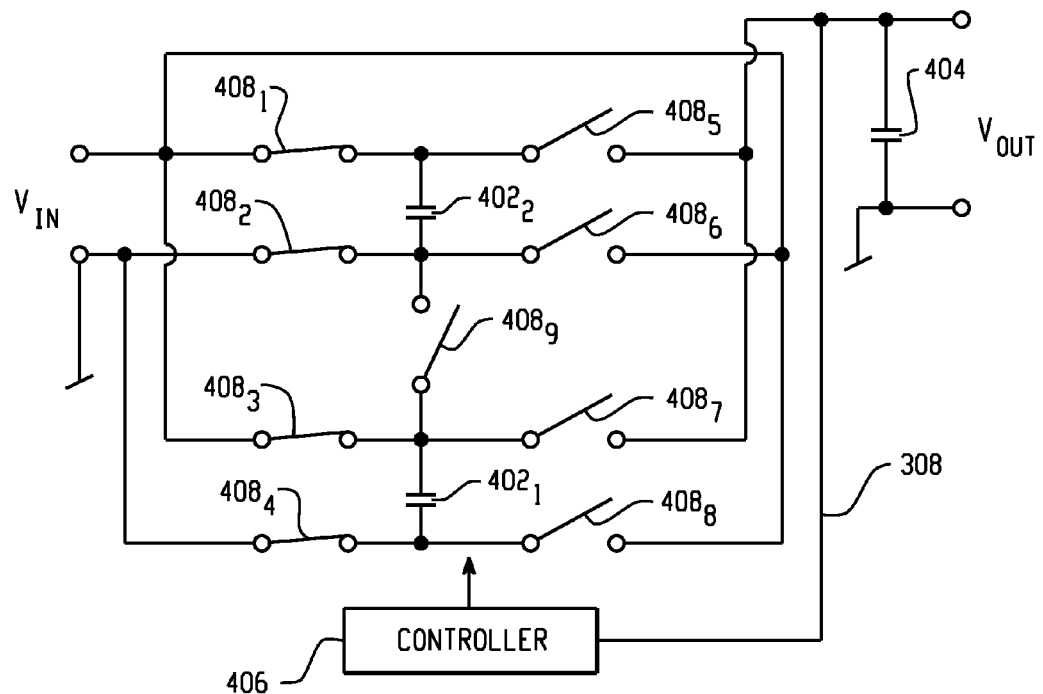

A charge pump which provides multiple operating modes is shown in FIG. 4E. As illustrated, the circuit includes first $402_1$ and second $402_2$ flying capacitors, an output capacitor 404, a plurality of switches $408_{1-9}$, and a controller 406. In one mode, the input is connected directly to the output by closing switches $408_1$ and $408_5$. In another mode, the circuit operates as a step down converter. More particularly, the switches $408_1$ and $408_5$ are operated in a manner similar to that described above in connection with FIG. 4A so as to provide the desired output. In another mode, the capacitors 402 are charged in alternating clock phases so that the converter functions as a voltage doubler. In a first clock phase, the first capacitor $402_1$ is connected to the input through switches $408_3$ and $408_4$, while the second capacitor $402_2$ is stacked on top of the input and connected to the output through switches $408_5$ and $408_6$. In the second clock phase, the second capacitor $402_2$ is connected to the input through switches $408_1$ and $408_2$, while the first capacitor $402_1$ is stacked on top of the input and connected to the output through switches $408_7$ and $408_8$. In still another mode, the circuit functions as up to a one and one half times (1.5x) voltage converter. In such an implementation, the capacitors 402 are connected in series for charging and in parallel for transferring energy to the output. In still another mode, the capacitors 402 are connected in parallel for charging and in series for transferring energy to the output so that the circuit functions as a voltage tripler.

The desired operating mode may be dynamically selected by the controller 406 based on the feedback signal 308. Such an implementation is particularly attractive in situations where the operating characteristics of the device electrical circuitry 112 may change based on ambient conditions or otherwise as a function of time, or where it is desirable to account for changes in the input voltage, for example as the batteries 106 discharge. While described as a circuit having multiple dynamically selectable operating modes, those of ordinary skill in the art will recognize that the circuit may be configured to provide only one or a subset of the described modes.

As noted above, the characteristics of the load presented by the device circuitry 112 depend on the nature and function of the device 100. In this regard, the thermal characteristics of the various device 100 electrical components should be selected so that the temperature rise under both operating and fault conditions is insufficient to cause ignition of flammable or combustible materials in the applicable hazardous location. The values of reactive and other energy storage components should also be selected so that, in the event of a fault condition, the released energy is insufficient to cause ignition of flammable or combustible materials in the applicable hazardous location. Internal wiring and other connections should be insulated and spaced appropriately. One source of guidance with respect to acceptable temperatures, component values, spacing, and the like is the known UL 913 standard.

Figure 5:
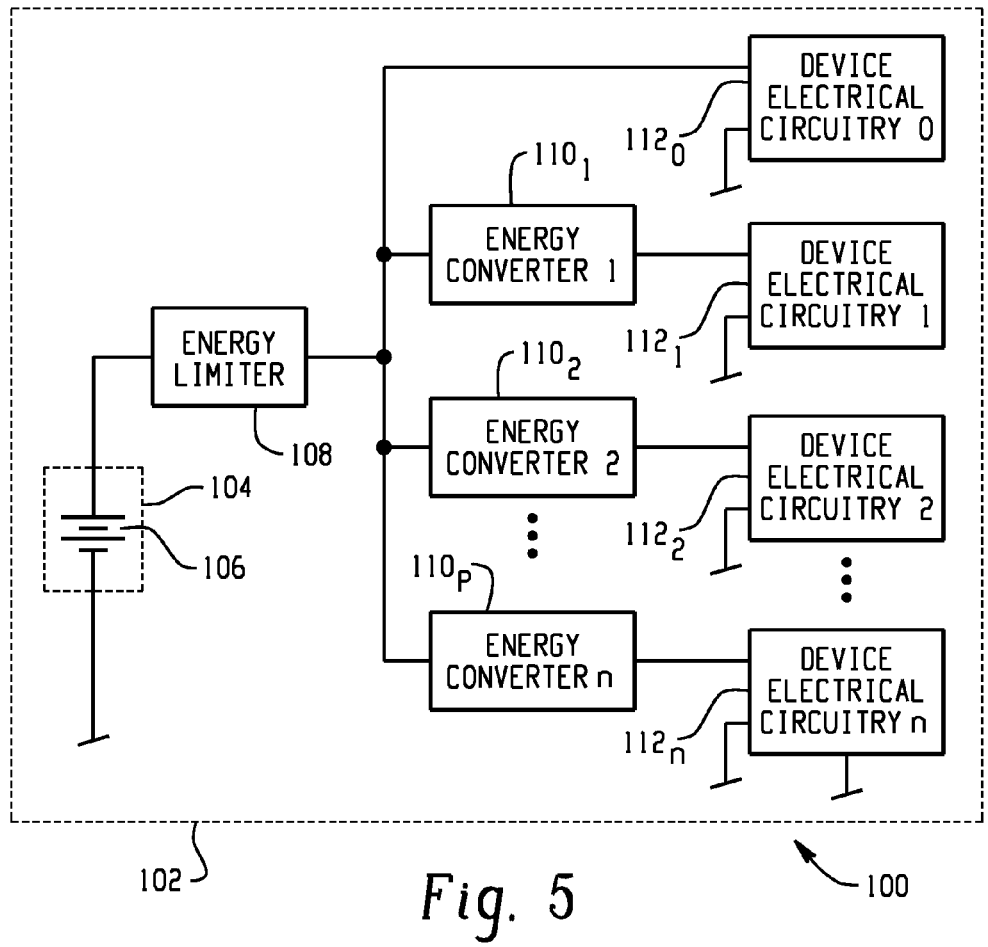
FIG. 5 depicts an intrinsically safe, battery powered device.

Variations are contemplated. For example, a particular device 100 may include a plurality of electrical circuits $112_0$, $112_1$, $112_2$ ... $112_p$, each requiring a different supply voltage and/or current. As one non-limiting example, a given device 100 may include an input sensor or transducer circuit which operates at a first relatively high voltage, signal conditioning circuitry connected to the transducer and which also requires a negative supply voltage, logic circuitry for determining if the measured value reaches an alarm condition and which can operate directly from the voltage provided by the batteries 106, and an alarm output or indicator circuitry such as one or more light emitting diodes (LEDs) which are advantageously powered by a current source. In such a situation, and as illustrated in FIG. 5, the device may be provided with a plurality of energy converters $110_1$, $110_2$ ... $110_p$, the number and function of which are determined based on the requirements of the various device electrical circuits 112.

More than one energy limiter 108 may be provided. In such an implementation, the device 100 is advantageously constructed so that each energy limited circuit can be evaluated separately for the purpose of evaluating intrinsic safety. More specifically, the separation and/or spacing of the various energy limited circuits is advantageously established so that the various circuits cannot reasonably be expected to become short circuited or otherwise so that a fault in one of the circuits cannot reasonably be considered to affect the intrinsic safety of another.

While the above discussion focused on standard AAA, AA, C, and D-size batteries, other battery sizes and form factors are also contemplated. Thus, for example, the battery receiving region may be configured to receive other generally cylindrical batteries, prismatic batteries, or coin cells. Other chemistries are also contemplated, including but not limited to carbon zinc, lithium ion (LiIon), lithium iron disulfide (Li/FeS$_2$), and nickel cadmium (NiCd), provided that the batteries are otherwise suitable for use in the desired hazardous location. The battery receiving region 104 may also be configured to accept only a single battery or three (3) or more batteries.

As noted above, the device 100 may be of a size and weight which are suitable for a hand-held or otherwise readily human portable device. In another variation, the device 100 may also be configured for fixed or semi-fixed operation. In such a situation, the device 100 may be provided with electrical connections which allow the device to be connected to fixed, external wiring. The device 100 may also be configured for operation with a transducer which is designed to be mounted at a fixed location.

Where the device 100 is ordinarily operated using power from an external source, the batteries 106 may be used to power the device 100 when the device is disconnected from the external source, in the event of a power failure, or otherwise in the absence of external power. In one such implementation, the device 100 is provided with an energy converter 110 configured to function as a battery charger. When external power is available, the converter 110 charges secondary battery(ies) 106 received in the battery receiving region 104. In still another configuration, the device 100 may be provided with external contacts which allow battery(ies) 106 received in the receiving region 104 to be connected to an external battery charger.

Still other variations in the energy converters 110 and converter topologies are contemplated. While energy converters 110 which use capacitive energy storage elements are especially well suited for intrinsically safe applications, converters 110 using inductive or other energy storage elements may also be implemented. Variations in the configuration of the controller 406 are also contemplated. For example, the controller 406 may include a constant or a variable frequency oscillator. Regulation of the output voltage and/or current may also be provided by varying a duty cycle of the energy transfer or otherwise without an oscillator. The energy converters 110 may be implemented using integrated circuits (ICs), discrete components, or combinations thereof. Those of ordinary skill in the art will also recognize that charge pump converter ICs are commercially available from a number of sources. Note also that the output capacitor 404 may be omitted, particularly where the device electrical circuitry 112 is tolerant of the resultant output swings.

In addition to being designed as intrinsically safe for use in Class I, Division I locations, the device 100 may be designed for use in other classes, divisions or groups (e.g., classes II or III, Division 2, Groups B-G, or the like). The device 100 may also be designed to conform to IEC, ATEX/CENELEC, or other classification standards, for example in Zones 0, 1, or 2.

Various devices 100 are contemplated. Non-limiting examples include communication devices, user operable signaling devices, measurement devices, automatic alarm or warning devices, flashlights and other light sources, actuators, and other operating devices. Examples of communication devices include radio frequency or infrared receivers, transmitters, transceivers, pagers, wired or wireless intercoms, or other one or two-way communication devices. Signaling devices include visual, audible, radio frequency or other signaling equipment, for example for signaling a distress or other condition. Examples of measurement devices include devices for measuring ambient or operating conditions such as temperature, gas or other material concentrations, time, or the like. Exemplary actuators include pumps, fans, motors, actuators, and microelectromechanical systems (MEMS). Other measurement devices include digital voltmeters, ammeters, ohmmeters, scales, and the like. Note also that, depending on the nature of the device 100, the device may perform a function which is specific to a petrochemical, agricultural, mining, industrial, or other facility.

Figure 6:
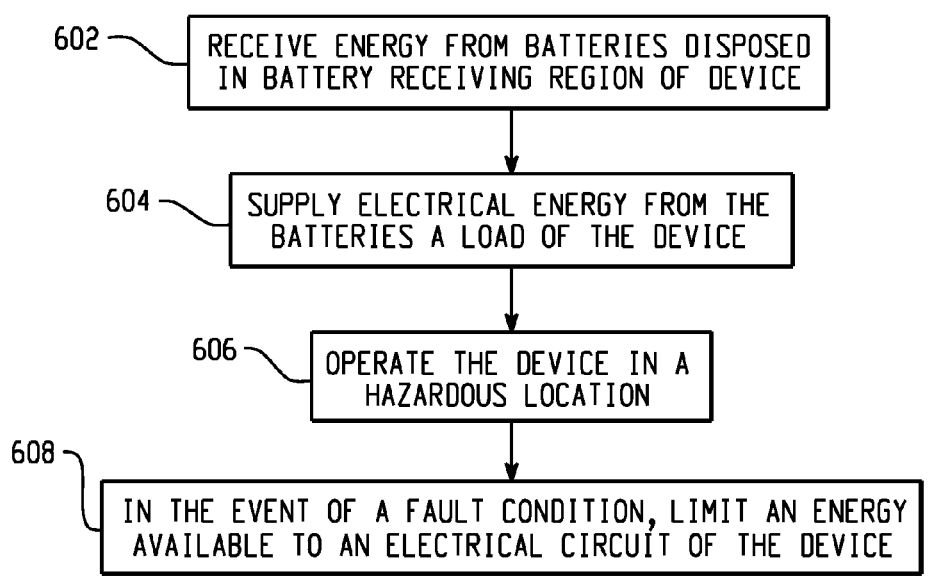
FIG. 6 depicts a method of operating an electrical device.

Operation of the device 100 will now be described in relation to FIG. 6. At 602, electrical energy is received from a battery or batteries disposed in the battery receiving region 104 of the device 100. At 604, the energy converter(s) 110 supplies energy from the battery(ies) 106 to the device electrical circuitry 112. At 606, the device 100 is operated in a hazardous location. In the event of a fault condition such as a component failure or a short circuit, the energy limiter(s) 108 limit the available energy at step 608.

The invention has been described with reference to the preferred embodiments. Of course, modifications and alterations will occur to others upon reading and understanding the preceding description. It is intended that the invention be construed as including all such modifications and alterations insofar as they come within the scope of the appended claims and the equivalents thereof.

What is claimed is:

1. An electrical device comprising:
a housing;
a battery receiving region within the housing;
device electrical circuitry within the housing;
an energy converter within the housing and having an input dynamic range for supplied electrical energy and the energy converter converts the supplied electrical energy to a level suitable for powering the device electrical circuitry as output electrical energy; and
an energy limiter within the housing that limits the supplied electrical energy.

2. The device of claim 1, the input dynamic range accommodates the supplied energy from primary and secondary batteries.

3. The device of claim 1, further comprising at least one battery to provide the supplied electrical energy.

4. The device of claim 3, the input dynamic range accommodates a decrease in voltage of the supplied power as the at least one battery is discharged.

5. The device of claim 1, further comprising a controller within the housing and coupled to the energy converter and the energy limiter.

6. The device of claim 5, the controller includes a control circuit which adjusts operation of a switch according to a measured value of the output electrical energy.

7. The device of claim 5, the energy converter provides feedback to the controller.

8. The device of claim 5, further comprising a switch to select one of a plurality of modes of operation of the energy converter.

9. The device of claim 8, the plurality of modes including a direct connection of a load to the supplied electrical energy.

10. The device of claim 8, the plurality of modes including operating the energy converter as a step down converter.

11. The device of claim 8, the plurality of modes including operating the energy converter as a voltage doubler.

12. The device of claim 1, the device electrical circuitry includes a plurality of electrical circuits requiring varied supply voltages and the level suitable for powering the device electrical circuitry is selected from the varied supply voltages.

13. The device of claim 1, further comprising a second energy limiter.

14. The device of claim 1, the housing is explosion proof.

15. An electrical device comprising:
a battery power source that supplies battery energy;
an energy converter receives the battery energy and supplies output energy;
an energy limiter that limits the battery energy; and
a controller coupled to the energy converter and the energy limiter.

16. The device of claim 15, the energy converter having a plurality of modes of operation comprising a direct connection, a step down converter, and a voltage booster.

17. The device of claim 16, further comprising a switch for selecting one of the modes of operation.

18. The device of claim 15, the controller selects a voltage level and controls the energy converter to supply the output energy at the selected voltage level.

19. The device of claim 15, the battery source is a rechargeable battery.

20. The device of claim 15, the controller obtains measurements of the output energy and modifies operation of the energy converter according to the measurements.

* * * * *